US005941618A

United States Patent [19]
Cheng

[11] Patent Number: 5,941,618
[45] Date of Patent: Aug. 24, 1999

[54] INTEGRATED POINT-OF-SALE CABINET SYSTEM WITH REMOVABLE COVERS

[75] Inventor: Tsung-Kan Cheng, Taipei, Taiwan

[73] Assignee: Mustek Corporation, Taipei Hsien, Taiwan

[21] Appl. No.: 08/816,110

[22] Filed: Mar. 11, 1997

[51] Int. Cl.[6] .............................. G06F 1/16; A47B 81/00

[52] U.S. Cl. ........................ 312/223.2; 361/724; 312/263

[58] Field of Search ............................ 312/223.1, 223.2, 312/257.1, 263, 265.5; 361/683, 724–727

[56] References Cited

U.S. PATENT DOCUMENTS

| | | | |
|---|---|---|---|
| 4,547,027 | 10/1985 | Scheibenreif . | |
| 4,620,808 | 11/1986 | Kurtin et al. . | |
| 4,624,510 | 11/1986 | Jedziniak | 312/252 |
| 4,880,191 | 11/1989 | Lake, Jr. . | |
| 4,909,579 | 3/1990 | Liu | 312/208 |
| 4,939,622 | 7/1990 | Weiss et al. | 361/725 |
| 5,016,849 | 5/1991 | Wu . | |
| 5,037,050 | 8/1991 | Lin et al. . | |
| 5,168,423 | 12/1992 | Ohgami et al. . | |
| 5,335,142 | 8/1994 | Anderson . | |
| 5,390,075 | 2/1995 | English et al. | 361/683 |
| 5,465,936 | 11/1995 | Wang . | |
| 5,495,389 | 2/1996 | Dewitt et al. | 361/683 |
| 5,510,955 | 4/1996 | Taesang | 361/685 |
| 5,713,647 | 2/1998 | Kim | 312/223.2 |
| 5,751,545 | 5/1998 | Jung | 361/683 |

*Primary Examiner*—Lynn D. Feild
*Attorney, Agent, or Firm*—Arnold White & Durkee

[57] ABSTRACT

An integrated, secured point-of-sale (POS) system comprises a cabinet housing computer electronics, a keyboard, a monitor, and a customer display assembled in a modular construction. The cabinet has a cover that is connected to a base using a pair of release rods for easy assembly and disassembly without the use of tools. The keyboard is attached to the cabinet with quick-release connectors. Security locks are provided in the keyboard to protect proprietary data stored in the POS system. The cabinet includes a printer platform for supporting a printer and a display platform for supporting the monitor and customer display. The monitor is connected to the display platform for two-dimensional displacement using a skewed rod extending from the monitor and cooperating with a guide slot in the display platform or vice versa. A monitor mounting mechanism employing a simple yet efficient pin-and-slot connection provides precise tilt-and-swivel motion of the monitor relative to the display platform. The monitor is connected to the monitor mounting mechanism using quick-release clips or couplings. The customer display is spring-mounted through a shock-absorbing support mechanism to the display platform. The support mechanism provides for quick-release height adjustment, rotation, and horizontal sliding motion of the customer display. The monitor and keyboard can be separated from the cabinet without the use of tools. The cabinet cover can be removed to access the computer electronics housed inside the cabinet without the need for tools or turning the cabinet over to undo screws.

12 Claims, 12 Drawing Sheets

INTEGRATED POINT-OF-SALE CABINET SYSTEM WITH REMOVABLE COVERS

FIELD OF THE INVENTION

This application relates generally to point-of-sale (POS) systems, and more particular to an integrated POS system of a modular construction with safe, quick assembly and disassembly for security, easy installation, and convenient service without the need for tools or turning over heavy parts or components housing electronics.

BACKGROUND OF THE INVENTION

Point-of-sale terminals are commonly used in retail stores to display and record information relating to sales transactions. A POS terminal generally includes a keyboard connected to a computer processor for the manual entry of data, a printer for printing a paper tape receipt for delivery to the customer, and a monitor display for displaying data during transactions. POS terminals also commonly include magnetic readers for reading the data recorded on the customers' credit cards and customer displays for displaying data to the customers.

Conventional POS terminals are generally bulky and difficult to assemble and disassemble for service and replacement. To access components for service, it is often necessary to turn over housings that contain the electronic components, which compromises the integrity of such components. In addition, the need to lift heavy objects may also jeopardize personnel safety. In most cases, various tools are necessary for assembly and disassembly, taking up unnecessary time and labor. Moreover, security measures for preventing access to proprietary information, such as pricing data contained in the POS terminal, by competitors have been inadequate.

SUMMARY OF THE INVENTION

There is therefore a need for a compact, integrated POS system of modular construction that is secure and safe, and provides for quick and easy assembly and disassembly.

It is a feature of the present invention to provide an integrated POS system that comprises a cabinet that houses the computer processor and includes a printer platform and a display platform, a detachable keyboard, a mounting mechanism for mounting a monitor onto the display platform, and an attachment mechanism for attaching a customer display onto the display platform.

It is another feature of this invention to provide quick-release mechanisms for assembling the cabinet, for attaching the keyboard to the cabinet, for mounting the monitor onto the display platform, and for attaching the customer display onto the display platform without the need for tools and with minimum labor and time.

It is a further feature of the invention to mount the monitor to the display platform for 2-dimensional displacement on the display platform, and for tilt and swivel of the monitor.

It is another feature of this invention to attach the customer display to the display platform for quick and easy vertical height adjustment, rotational movement, and horizontal adjustment of the display without the need for tools.

It is yet another feature of the invention to resiliently attach the customer display to the display platform to minimize accidental breakage of the customer display mount.

In accordance with one aspect of the present invention, an electronics cabinet assembly comprises a base frame having a bottom, a left panel, and a right panel. The left panel includes at least one left base portion having an aperture generally parallel with the left panel. The right panel includes at least one right base portion with an aperture disposed generally parallel with the right panel. The electronics cabinet assembly further comprises a cabinet cover having a top, a left wall, and a right wall. The left wall includes at least one left cover portion with an aperture generally aligned with the aperture of the left base portion. The right wall includes at least one right cover portion with an aperture generally aligned with the aperture of the right base portion. A left release rod extends through the aperture of the left base portion and the aperture of the left cover portion from a front side of the cabinet assembly to a rear side of the cabinet assembly. A right release rod extends through the aperture of the right base portion and the aperture of the right cover portion from the front side to the rear side of the cabinet assembly.

In accordance with another aspect of the present invention, a computer cabinet assembly comprises a frame means for housing electronic components and a support means for supporting a monitor. The frame means has a plurality of frame openings and the support means has a plurality of support openings. The computer cabinet assembly further comprises a means for releasably sliding through the plurality of frame openings and the plurality of support openings to secure the support means with the frame means.

Another aspect of this invention is a point-of-sale system comprising a cabinet having a base, a printer platform, a monitor platform, a first bar, a second bar, and a keyboard. The printer platform includes at least one first attachment section which has a first opening. The monitor platform includes at least one second attachment section which has a second opening. The base includes at least one third attachment section which has a third opening and at least one fourth attachment section which has a fourth opening. The first bar passes slidably through the first opening and third opening while the second bar passes slidably through the second opening and fourth opening. A monitor and a display are supported by the monitor platform.

Yet another aspect of the invention is an apparatus for supporting a monitor which comprises a support surface having a slot stretching from a first end to a second end. A protruding member extends from the monitor at least partially through the slot and movable between the first end and the second end. The protruding member is rotatably connected to a skewed position on the monitor away from a vertical center of rotation of the monitor.

In accordance with another aspect of this invention, a monitor-supporting apparatus comprises a monitor, a cabinet having a cabinet surface, and a means for connecting the cabinet surface with the monitor at a pivoting location on the monitor spaced from a vertical center of rotation of the monitor to guide the monitor for displacement over an entire area of the platform surface.

In accordance with yet another aspect of the present invention, a tilt-and-swivel apparatus for mounting an LCD monitor on a platform comprises a mounting plate connected to the platform to define a gap between a bottom surface of the mounting plate and the platform. The mounting plate has a left edge, a right edge, and a generally cylindrical tab having a rounded tip extending from the bottom surface toward the platform partially through the gap. A back plate is hinged onto a rear surface of the LCD monitor. The back plate is smaller in thickness than the gap and includes a generally rounded indentation on an upper surface engaging the rounded tip of the tab.

Another aspect of this invention is an apparatus for releasably attaching a monitor for tilt and swivel movement which comprises a support having a notch and a support edge connected to the monitor for rotation between a closed position and an open position. In the closed position, an upper surface of the support bears against a surface of the monitor. In the open position, the support is angularly displaced from the upper surface by an angle. The apparatus further includes a means for detachably connecting the notch with a platform for planar rotation of the support relative to the platform about the notch.

Another aspect of the invention is an apparatus for releasably attaching a monitor for tilt and swivel movement. The apparatus comprises a swivel member which has a protrusion and a tilt edge connected to the monitor for tilt rotation with a range of angles defined between the swivel member and the monitor. The apparatus comprises a means for detachably connecting the protrusion with a frame for swivel rotation of the swivel member relative to the frame about the protrusion.

Yet another aspect of the present invention is a point-of-sale system comprising a cabinet having a platform and a keyboard connected to the platform. A monitor is mounted on the platform. A customer display includes a display box, a horizontal slide bar attached to the display box, and a vertical pole having a distal end connected to a display platform. The vertical pole includes a proximal end connected to a proximal mounting portion that is horizontally slidably mounted to the horizontal slide bar.

In accordance with another aspect of the invention, a point-of-sale system comprises a housing, a monitor connected to the housing, and a display screen. The point-of-sale system further comprises a means for supporting the display screen on the cabinet for horizontal sliding and vertical rotational movement of the display screen.

It is understood that the present invention may be applied for other uses. For instance, the POS monitor mounting mechanism can be used for other display units commonly used for apparatus such as computers, data terminals, and word processors. The POS cabinet and keyboard assembly can be used for housing computer components in similar apparatus.

BRIEF DESCRIPTION OF THE DRAWINGS

The preferred embodiments of this invention, illustrating all their features, will now be discussed in detail. These embodiments depict the novel and non-obvious POS system of this invention shown in the accompanying drawings, which are included for illustrative purposes only. These drawings include the following figures, with like numerals indicating like parts.

DETAILED DESCRIPTION OF THE INVENTION

Figure 1:
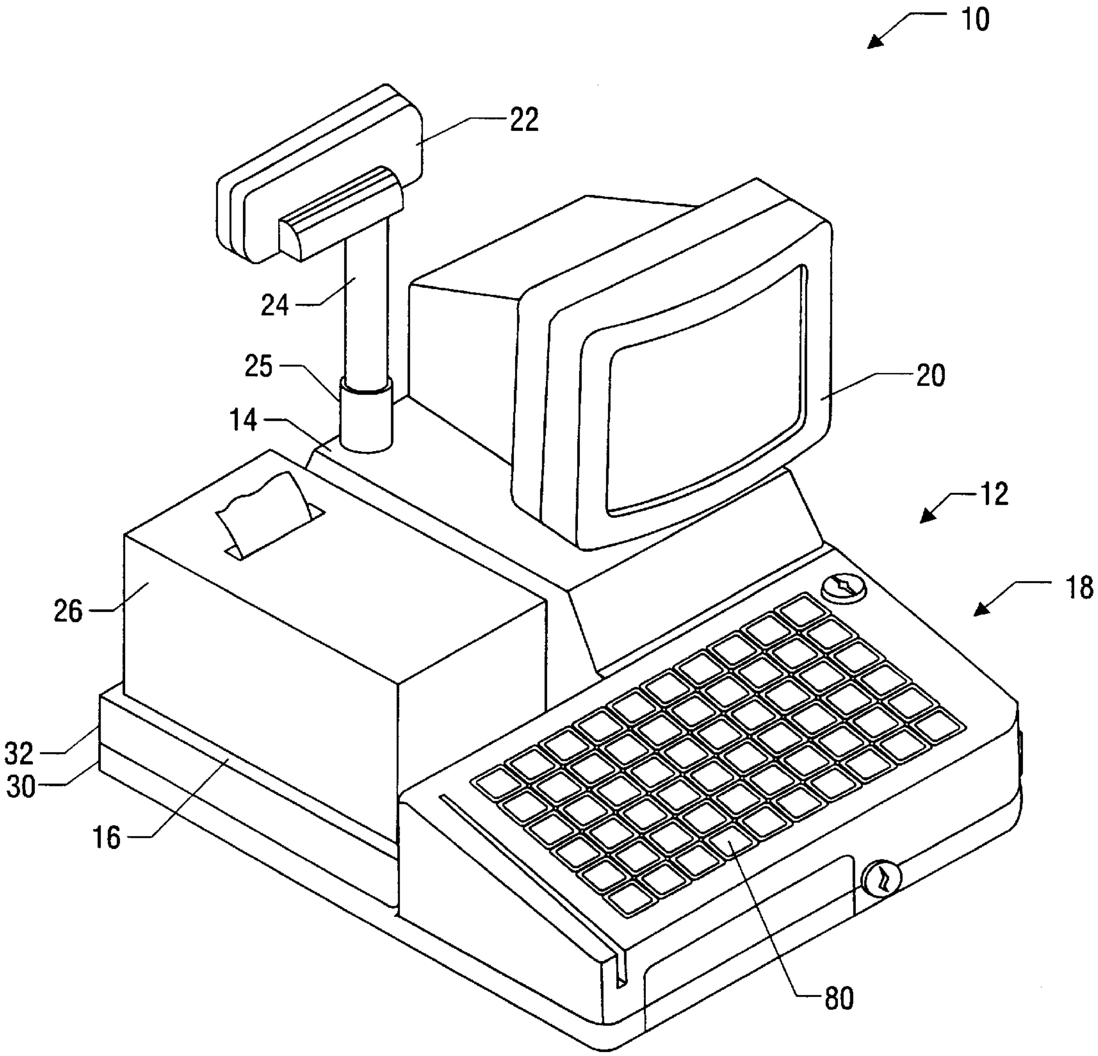
FIG. 1 is a perspective view illustrating an embodiment of the POS system of this invention.

Referring to FIG. 1, an embodiment of the POS system 10 of the present invention is advantageously an integrated system that comprises a cabinet 12 having a display platform 14 and a printer platform 16. The cabinet 12 houses electronic components such as a computer processor (not shown). A keyboard 18 is connected to the cabinet 12 at the front. A monitor 20 and a customer display 22 are disposed on the display platform 14. The customer display 22 is desirably supported by an attachment mechanism 24. The printer platform 16 supports a printer 26.

The POS system 10 advantageously employs a modular construction whereby the keyboard 18 is easily detachable from the front of the cabinet 12 and the monitor 20 is easily detachable from the display platform 14 without the need to turn over the cabinet 12. The customer display 22 is also desirably detachable at the base 25 of the attachment mechanism 24 from the display platform 14. The mechanisms employed in the POS system 10 are described in more detail below. Other aspects of the modular construction are illustrated in subsequent drawings and discussed as follows.

A. Modular Cabinet Assembly

Figure 2:
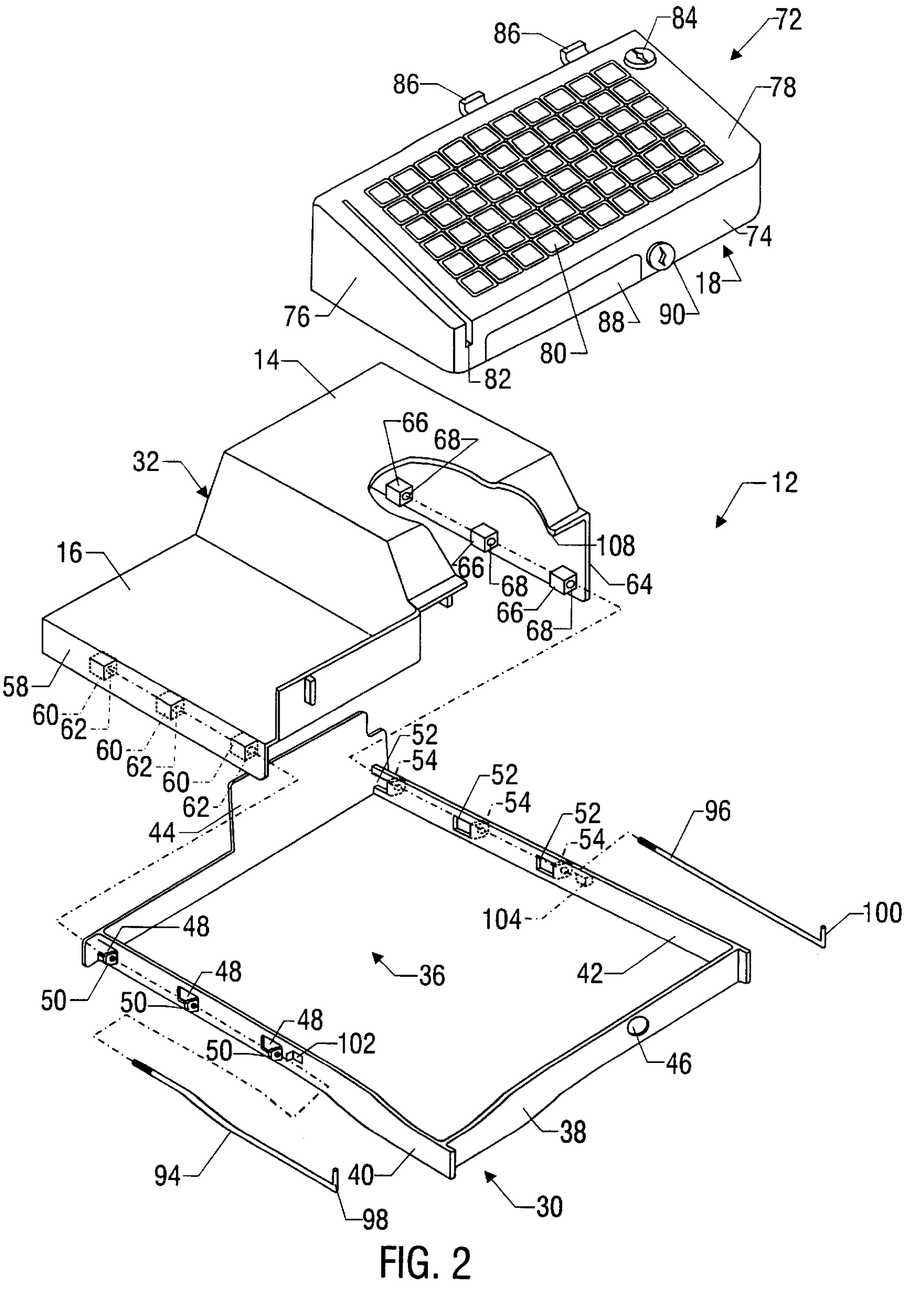
FIG. 2 is an exploded perspective view illustrating the cabinet assembly with the detachable keyboard of the POS system.

FIG. 2 shows the construction of the cabinet assembly that includes a base frame 30, a cabinet cover 32 connected to the base frame 30, and the detachable keyboard 18 connected to the base frame 30 and the cabinet cover 32 to form an enclosure that houses electronics (not shown). The base frame 30 desirably has a base 36 that is generally rectangular, a front wall 38 attached to the front of the base 36, a left side wall 40 connected to the left side of the base 36 and the front wall 38, a right side wall 42 connected to the right side of the base 36 and the front wall 38, and a rear wall 44 connected to the rear of the base 36, the left side wall 40, and the right side wall 42. The front wall 38 desirably includes a key hole 46. The left side wall 40 desirably includes at least one left knock-out portion 48, more desirably a plurality of spaced left knock-out portions 48, extending generally perpendicular to the left side wall 40 outwardly and providing a hole 50 therethrough. The right side wall 42 also desirably includes at least one right knock-out portion 52, more desirably a plurality of spaced right knock-out portions 52, extending generally perpendicular to the right side wall 42 outwardly and providing a hole 54 therethrough. In the embodiment shown, the walls 38, 40, 42, 44 are generally planar.

The cabinet cover 32 includes the display platform 14 connected to the printer platform 16. The display platform 14 is advantageously elevated above the printer platform 16, desirably by a height approximately equal to the height of the printer 26 to avoid blocking the monitor 20 with the printer 26 and allow turning and easy viewing of the monitor 20, as seen in FIG. 1. The cabinet cover 32 comprises a left side panel 58 which desirably includes at least one left block 60, more desirably a plurality of spaced left blocks 60, disposed inwardly and providing a hole 62 extending therethrough generally parallel to the left side panel 58. The cabinet cover 32 further comprises a right side panel 64 which desirably includes at least one right block 66, more desirably a plurality of spaced right blocks 66, disposed inwardly and providing a hole 68 extending therethrough generally parallel to the right side panel 64. The holes 62 of the left blocks 60 of the cabinet cover 32 are preferably arranged to align with the holes 50 of the left knock-out portions 48 of the base frame 30, and the left blocks 60 bear against the left knock-out portion 48, when assembled. The holes 68 of the right blocks 66 of the cabinet cover 32 are preferably arranged to align with the holes 54 of the right knock-out portions 52 of the base frame 30, and the right blocks 66 bear against the right knock-out portions 52, when assembled.

The keyboard 18 has a top cover 72, a front cover 74, a left cover 76, and a right cover 78. The top cover 72 includes the keyboard keys 80 and a reader slot 82 including a magnetic reader for reading credit cards. The top cover 72 desirably includes a key slot 84 having different positions to provide high freedom of product classification or security level control for the POS system 10 such that a selection key may be used to vary the product classification or the security level for accessing the data stored in the electronics inside the cabinet through the keyboard keys 80. A plurality of clips 86 are provided near the rear of the top cover 72 for attachment. The top cover 72 is desirably slightly inclined. The front cover 74 desirably includes an opening 88 for inserting floppy discs and compact discs. The front cover 74 advantageously includes a security lock key slot 90 to secure data communication ports (not shown) generally provided in the rear of the cabinet 12 to prevent theft of proprietary data stored in the electronics housed in the cabinet 12. The security lock key slot 90 preferably is aligned with the key hole 46 provided in the front wall 38 of the base frame 30 to allow a security key to access the interior of the cabinet 12.

Figure 3:
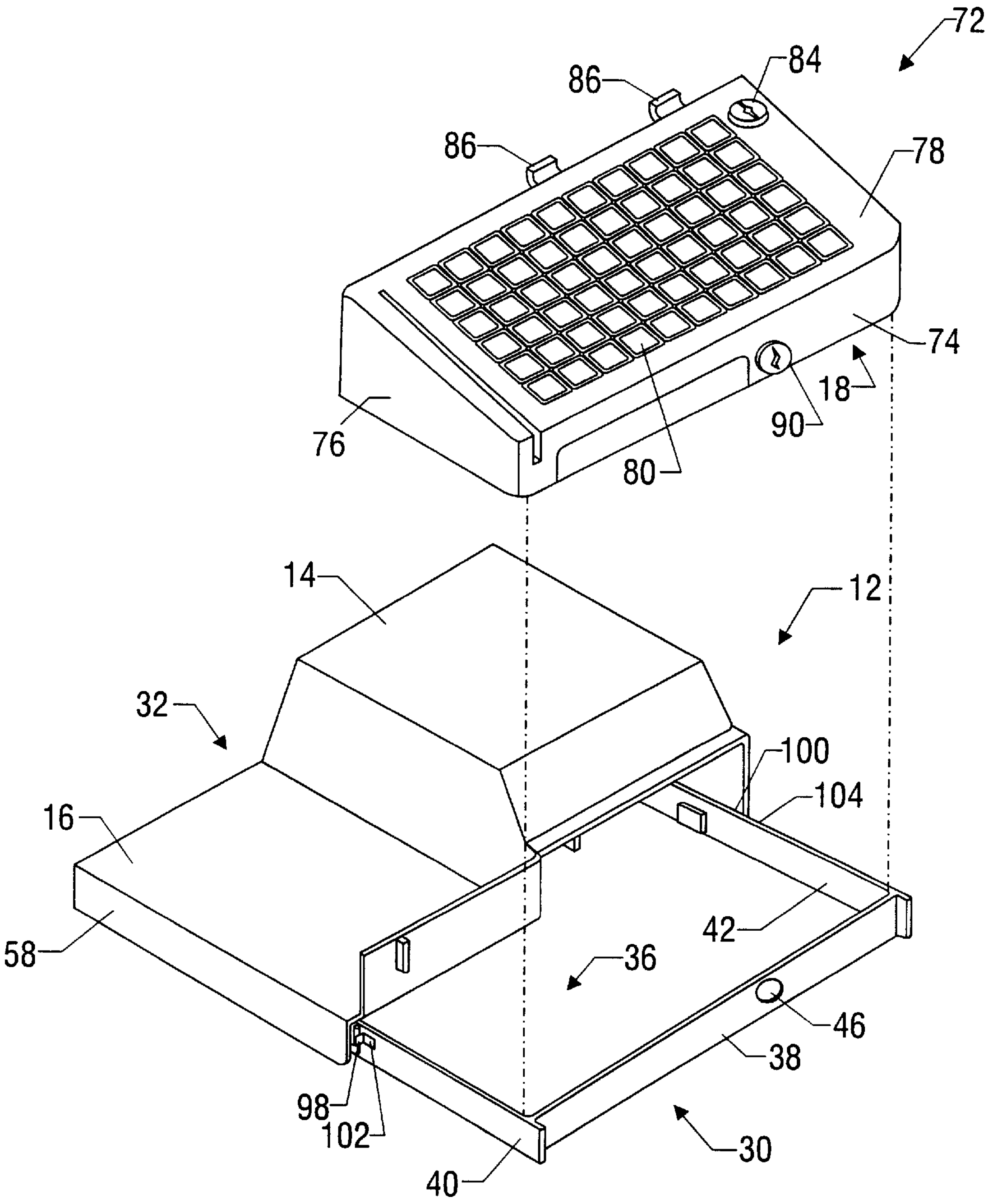
FIG. 3 is a perspective view of the assembled cabinet illustrating the attachment of the detachable keyboard with the cabinet.

As shown in FIGS. 2 and 3, the cabinet cover 32 and the base frame 30 are held together with a pair of cabinet release rods 94, 96. The left release rod 94 and right release rod 96 slide respectively through the holes (62, 68) provided in left blocks 60 and right blocks 66 along the interior of the left side panel 58 and right side panel 64 of the cabinet cover 32 and respectively through holes (50, 54) provided in left knock-out portions 48 and right knock-out portions 52 along the left side wall 40 and right side wall 42 of the base frame 30. The left and right release rods 94, 96 have handles 98, 100 that rest respectively against left and right tabs 102, 104 as shown in FIGS. 2 and 3 to lock the rods 94, 96 in place. The release rods 94, 96 thus are able to secure the cabinet cover 32 to the base frame 30 without the need for screws or fasteners. The assembly and disassembly of the cabinet cover 32 and base frame 30 are quick and easy. The base frame 30, cabinet cover 32, and keyboard 18 may be made of plastic or metal, or a combination of the two. They may be cast or molded, and the components may be welded, adhered, or attached by methods known in the art.

It is understood that other methods of connecting the cabinet cover 32 to the base frame 30 can be used other than the blocks and knock-out portions, such as providing a long opening (not shown) through a thick left side wall 40 and a long opening through a thick left side wall 42 of the base frame 30. The left release rod 94 may pass through an opening of a left attachment plate (not shown) provided at the front of the cabinet cover 32 adjacent the left side panel 58, through the long opening, and through a left attachment support (not shown) provided near at the rear of the cabinet cover 32 adjacent the left side panel 58. The right release rod may pass through a right attachment plate (not shown) provided at the front of the cabinet cover 32 adjacent the right side panel 64, through the long opening, and through a right attachment support (not shown).

It is also noted that the side panels and side walls may be either planar or curved. FIGS. 2 and 3 show straight release rods for connecting planar side panels and side walls. In another embodiment where the side panels and side walls are curved, curved release bars would be used for connection (not shown). Moreover, although FIG. 2 shows a pair of rods, other structural members that can serve the same function may be used, including wires and cables that are sufficiently strong.

To secure the keyboard 18 to the base frame 30 and cabinet cover 32, the clips 86 are provided along the rear of the keyboard 18 to facilitate easy attachment and detachment. The clips 86 cooperate with an interior groove or corner 108 of the cabinet cover 32, as best seen in FIG. 2, to attach the keyboard 18 to the cabinet cover 32 and position it over the base frame 30. If it is desirable to secure the keyboard 18 to the front of the base frame 30, clips or screws (not shown) can be provided to attach the front portion of the keyboard 18 to the front wall 38 of the base frame 30. In addition, other quick-release mechanisms may also be employed, such as detachable joints and couplings (not shown). The modular assembly of the cabinet 12 with quick-release features facilitates easy disassembly of the components without the need to turn over the cabinet assembly, which is particularly advantageous for the base frame 30 that houses the electronic components.

B. Monitor Mounting Mechanism

Figure 10:
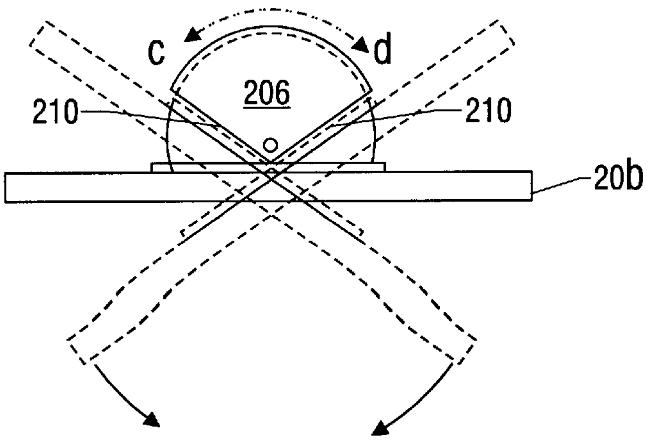
FIG. 10 is a schematic view illustrating the swivel of the LCD monitor display of FIG. 8 facilitated by the mounting mechanism of FIG. 9*a* on the display platform.

Two types of monitors may be used in the POS system 10, CRT monitor 20*a* and LCD monitor 20*b*. FIGS. 4*a*–7 illustrate the mounting mechanism 122 for mounting a CRT monitor 20*a* to the display platform 14 of the cabinet 12 for tilt-and-swivel motion as well as for two-dimensional movement of the CRT monitor 20*a* over the display platform 14. FIGS. 8–10 illustrate the mounting of an LCD monitor 20*b* to the display platform 14 for tilt-and-swivel movement of the LCD monitor 20*b*. Although the mounting mechanisms are illustrated for a CRT monitor 20*a* and an LCD monitor 20*b*, other monitors may be used in conjunction with these mounting mechanisms. As discussed below, a CRT monitor 20*a* may be mounted on the mounting mechanism of FIGS. 8–10 and an LCD monitor 20*b* may be mounted on the mounting mechanism 122 of FIGS. 4*a*–7.

1. CRT Monitor a. Tilt & Swivel

Figure 4A:
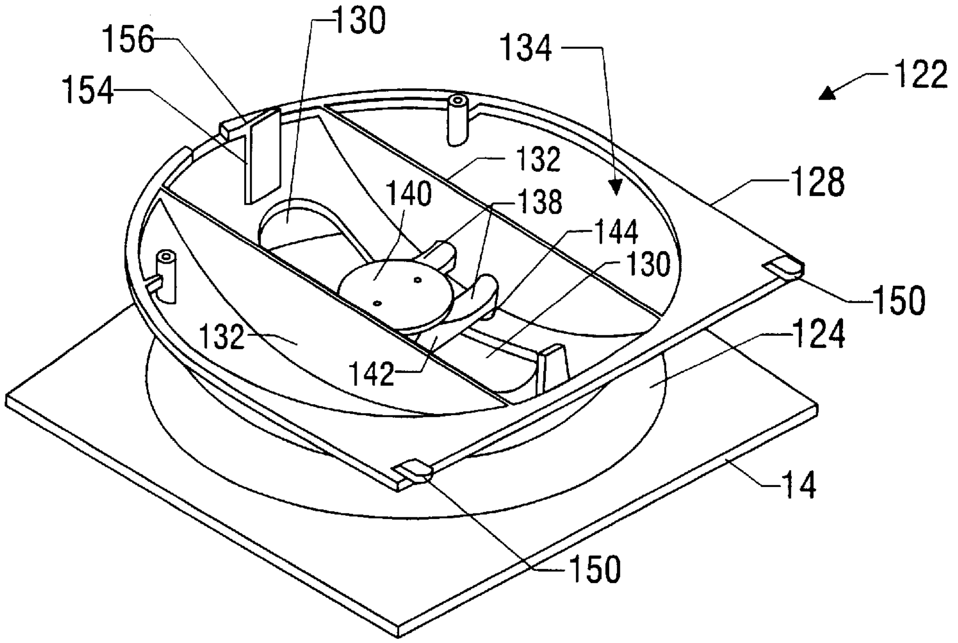
FIG. 4*a* is a perspective view of the tilt-and-swivel mounting mechanism for the monitor.

The mounting mechanism 122 for the CRT monitor 20*a* is shown in FIGS. 4*a* to 7, and provides two-dimensional movement, tilt and swivel, and quick-release mounting of the monitor 20*a*. As best seen in FIGS. 4*a* and 4*b*, the mounting mechanism 122 comprises a crater base 124 which is attached to the partially shown display platform 14 of the cabinet cover 32 of FIG. 1, a swivel spindle 126 connected to the center portion of the crater base 124, and a monitor support 128 which rests on top of the crater base 124. The support 128 desirably has the shape of a bowl and a curvilinear tilt slot 130 that extends through the center portion of the support 128. The tilt slot 130 is sized to allow the monitor support 128 to move relative to the swivel spindle 126 along the length of the tilt slot 130 for tilting of the monitor support 128 and to facilitate rotational or swivel movement of the monitor support 128 relative to the swivel spindle 126. The tilt slot 130 desirably has a pair of generally parallel edges joined at two rounded ends. A pair of reinforcing ribs 132 are desirably provided across the concave side 134 of the monitor support 128 for structural reinforcement and stability of the monitor support 128.

The monitor support 128 and crater base 124 are desirably held together by two guide bars 138 disposed adjacent the swivel spindle 126 and a restraint member in the form of a cover disk 140 disposed on top of the guide bars 138 and connected onto the top of the swivel spindle 126. The guide bars 138 are configured to slide on top of the support 128 adjacent the tilt slot 130 and rotate under the cover disk 140. The swivel spindle 126 defines the vertical center of rotation of the monitor 20*a*. In the embodiment shown in FIGS. 4*a* and 4*b*, each guide bar 138 has a rounded hump 142 that makes contact with the cover disk 140 with a generally line contact (i.e., contact along generally a line with minimal thickness) to minimize friction between the guide bar 138 and cover disk 140 to facilitate sliding therebetween. Each guide bar 138 desirably has two rounded tabs 144 near its ends which make contact with the monitor support 128 adjacent the tilt slot 130. The rounded tabs 144 make generally line or point contacts with the monitor support 128 to minimize friction therebetween to facilitate low-friction sliding.

The cover disk 140 holds the guide bars 138 in place and exerts sufficient forces on the guide bars 138 to maintain contact of the bars with the monitor support 128 adjacent the tilt slot 130 but not so much force as to prevent the guide bars 138 from sliding on top of the support 128 or rotating underneath the cover disk 140. The rotation of the support 128 and guide bars 138 relative to the swivel spindle 126 provides the swivel motion of the monitor support 128 and hence the CRT monitor 20*a* with respect to the display platform 14. The sliding motion of the support 128 through the curvilinear slot relative to the swivel spindle 126 results in the tilt motion of the monitor support 128 and hence the CRT monitor 20*a*. It is noted that the guide bars 138 are not required for the operation of the tilt-and-swivel feature of the mechanism, but they facilitate such movement by minimizing sliding friction that may impede smooth tilt and swivel and cause wear and tear of the sliding surfaces.

Figure 4B:
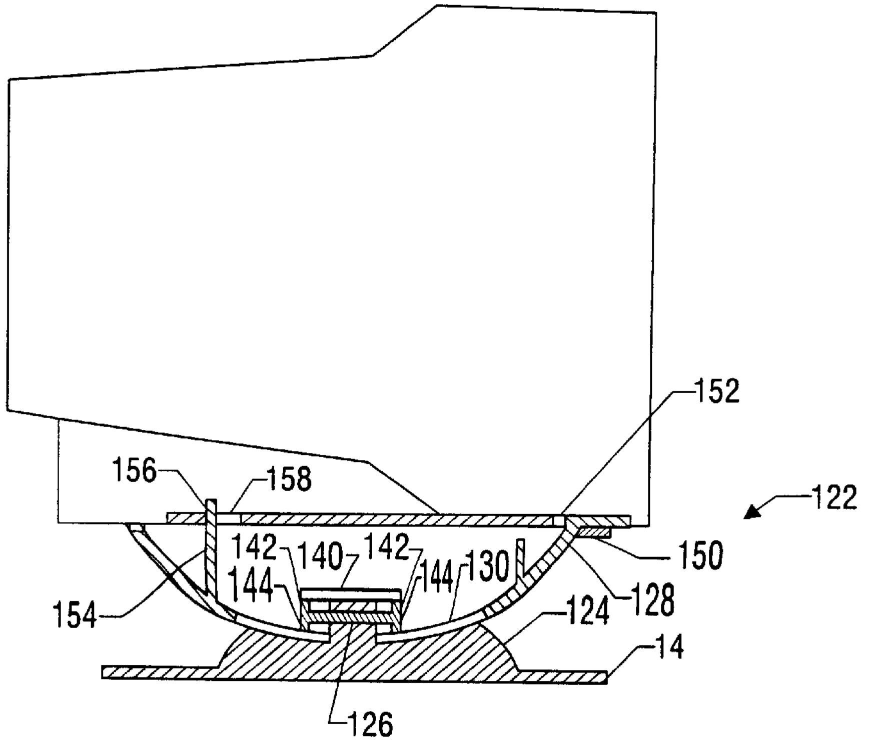
FIG. 4*b* is a side cross-sectional view of the tilt-and-swivel mounting mechanism of FIG. 4*a* illustrating the mounting of the monitor.

FIGS. 4*a* and 4*b* illustrate a "pin and slot" connection for the tilt-and-swivel mechanism. Other "pin and slot" connections as well as another type of connection, the "key and slot" connections, are known in the art. U.S. Pat. No. 5,037,050, which is incorporated herein by reference, discusses some of these connections, some of which require complicated structures or attachments while others do not provide the precise control that the current tilt-and-swivel mechanism offers. The present invention provides a simple tilt-and-swivel mechanism that is easy to operate, offers smooth and precise adjustment, and is quick and easy to assemble.

b. Quick-Release Mounting

As shown in FIGS. 4*a* and 4*b*, the CRT monitor 20*a* is advantageously held onto the monitor support 128 with a quick-release mechanism comprising a pair of clips 150 extending from a front edge of the monitor support 128 that engage a pair of clip slots 152 desirably with seats 153 at the bottom of the front end of the monitor 20*a*. The quick-release mechanism further comprises a rear clip 154 extending from the rear portion of the monitor support 128 and having an angled tip 156 that engages a rear slot on the bottom of the back end of the monitor 20*a* for quick-release mounting of the CRT monitor 20*a*. To mount the CRT monitor 20*a* onto the monitor support 128, the clips 150 are inserted through the clip slots 152 and rest on the seats 153 at the front end of the monitor 20*a*. The back end of the CRT monitor 20*a* is then lowered onto the support 128 to allow the angled tip 156 of the rear clip 154 to engage and grip the rear slot 158. The rear clip 154 of FIGS. 4*a* and 4*b* provides easy assembly of the monitor 20*a* with the monitor support 128, but does not facilitate easy disassembly of the monitor 20*a* from the monitor support 128 because the rear clip 154 is not easily reachable to disengage the connection.

Figure 5A:
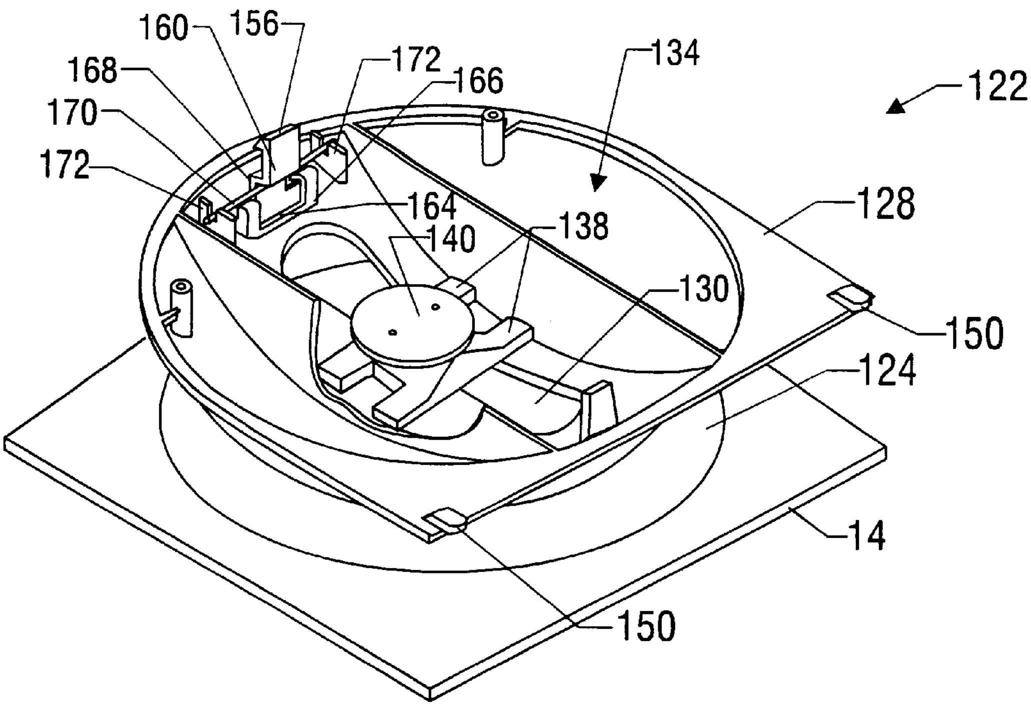
FIG. 5*a* is a perspective view of the tilt-and-swivel mounting mechanism of FIG. 4*a* illustrating a quick-release mechanism for attaching the monitor to the mounting mechanism.
Figure 5B:
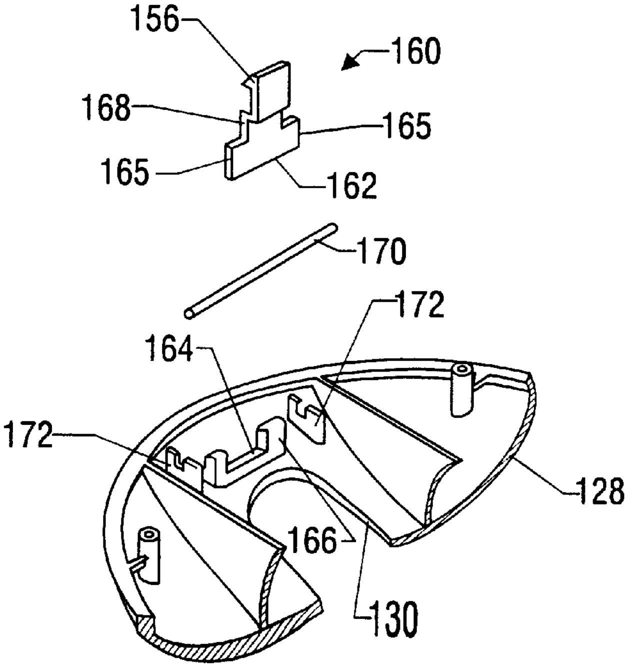
FIG. 5*b* is an exploded view of the quick-release mechanism of FIG. 5*a*.
Figure 6A:
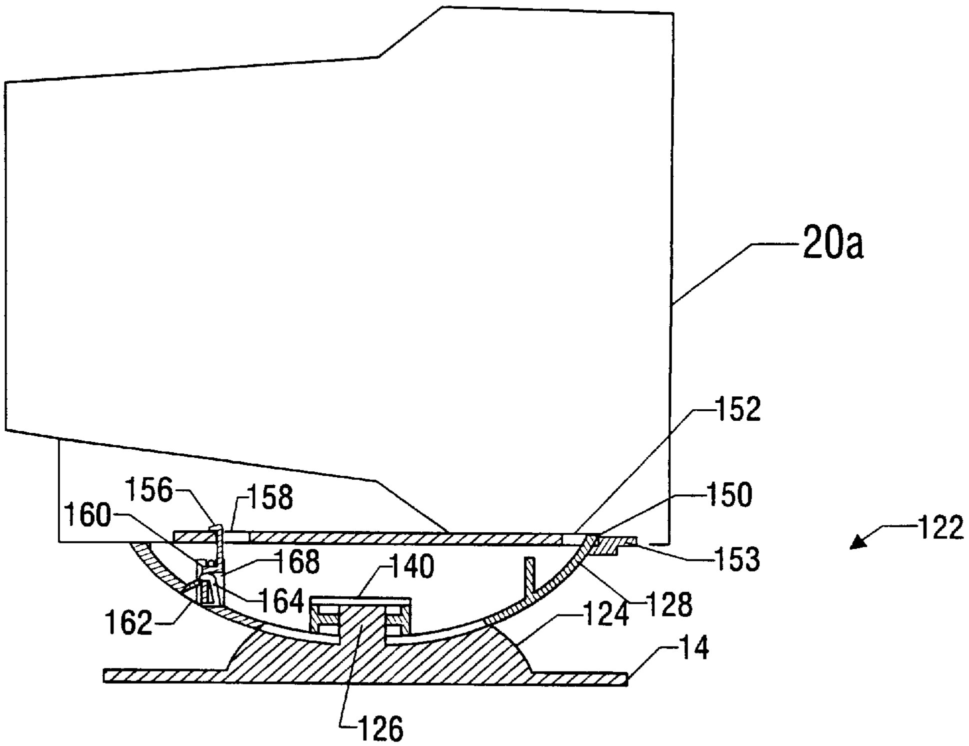
FIG. 6*a* is a side cross-sectional view of the quick-release mechanism of FIG. 5*a* illustrating the attachment of the monitor to the mounting mechanism.
Figure 6B:
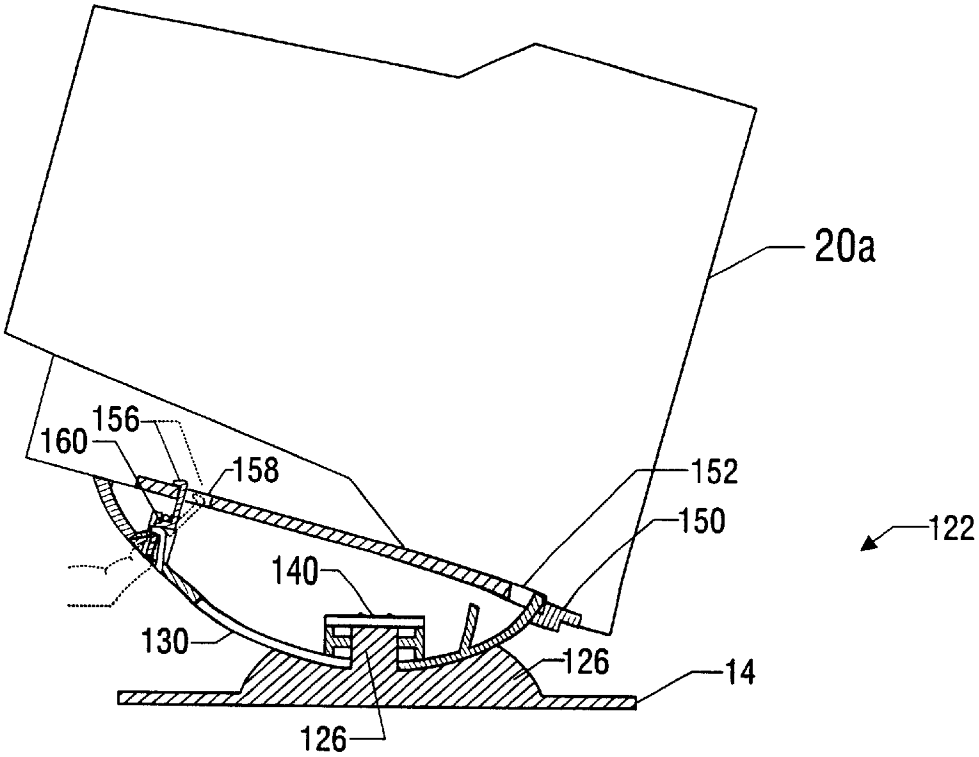
FIG. 6*b* is a side cross-sectional view of the quick-release mechanism of FIG. 5*a* illustrating the detachment of the monitor from the mounting mechanism.

FIGS. 5*a*–6*b* illustrate another rear clip 160 that facilitates quick-release assembly and disassembly of the CRT monitor 20*a* with the monitor support 128. As best seen in FIGS. 6*a* and 6*b*, it is desirable to be able to assess and disengage the rear clip 160 from the rear slot 158 with a finger to facilitate quick detachment of the CRT monitor 20*a* from the monitor support 128. The mechanism that connects the rear clip 160 to the support 128 to achieve this result is desirably a lever mechanism that is best seen in FIGS. 5*a* and 5*b*. The rear clip 160 includes a lever portion 162 that extends opposite from the angled tip 156 through an opening 164 in the monitor support 128 to a position that can be reached by a human finger as shown in FIG. 6*b*. The edge of the opening 164 provides a fulcrum 166 for the lever portion 162. The lever portion 162 has a pair of wings 165 that extend across the opening 164 to secure the lever portion 162 of the rear clip 160 on the external, convex side of the monitor support 128. The rear clip 160 includes a bent middle portion 168 above the fulcrum 166. The middle portion 168 desirably engages an elastic rod 170 that is supported at the ends by notched blocks 172 attached on the monitor support 128 as shown in FIG. 5*a*. When the finger pushes the lever portion 162 of the rear clip 160, the middle portion 168 pushes against the elastic rod 170 such that the angled tip 156 disengages the edge of the rear slot 158 at the bottom of the CRT monitor 20*a*, as best seen in FIG. 6*b*. To re-engage the angled tip 156, the finger is released to allow the elastic rod 170 to reform to its original shape and push the angled tip 156 against the edge of the rear slot 158 to lock the CRT monitor 20*a* in position, as shown in FIG. 6*a*.

Although FIGS. 4*b*–6*b* show a CRT monitor 20*a*, other types of monitors can also be supported by the monitor support 128 as long as the monitor has the corresponding clip slots 152 and rear slot 158 to engage the clips 150 and rear clip 160. The quick-release mounting of the monitor 20*a* facilitates quick and easy service and replacement of the monitor 20*a* and the mounting mechanism 122.

c. Two-Dimensional Movement

Figure 7:
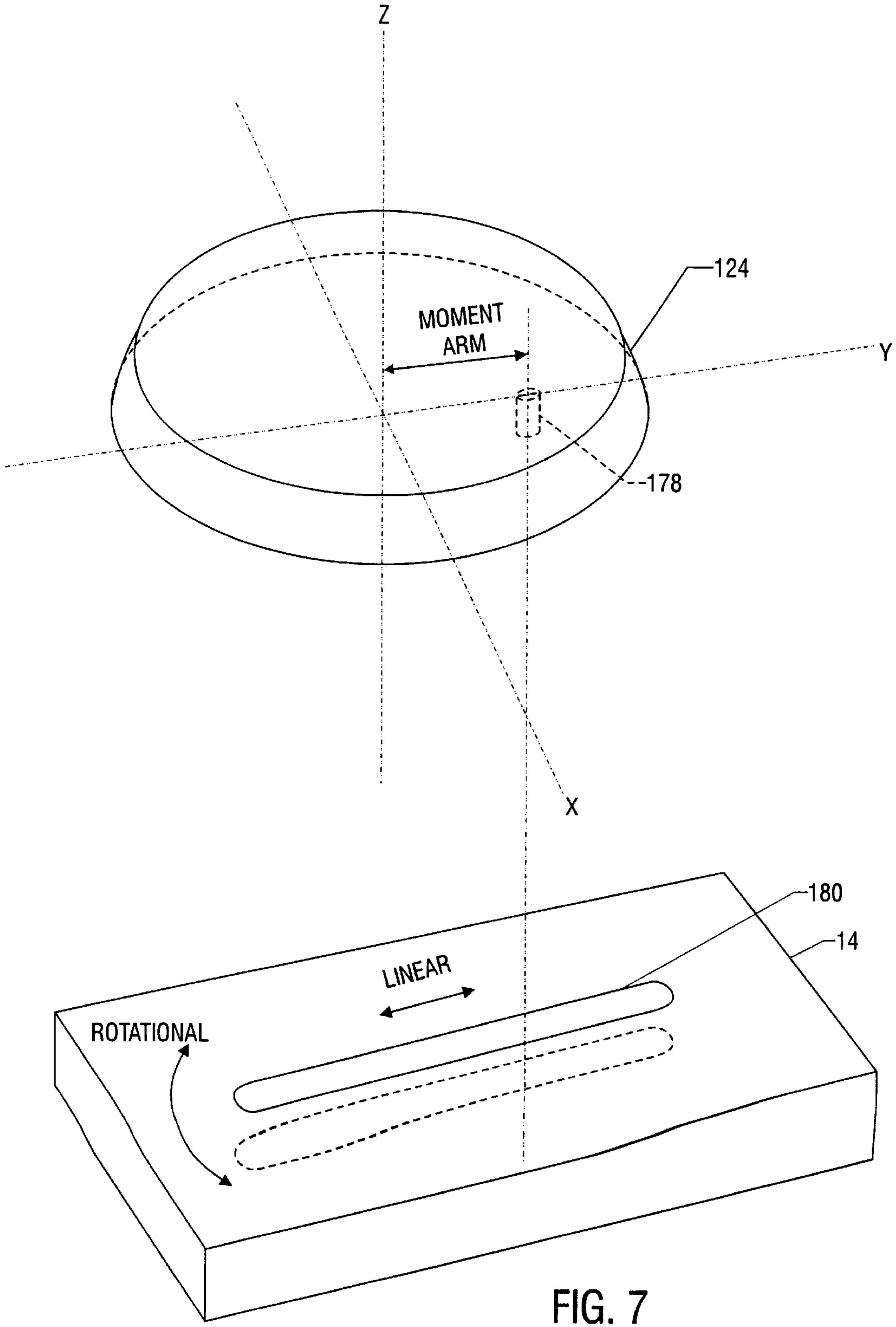
FIG. 7 is an exploded perspective view of the connection between the tilt-and-swivel mechanism of FIG. 4*a* and the monitor platform of the cabinet cover illustrating the two-dimensional movement of the tilt-and-swivel mechanism on the monitor platform.
Figure 8:
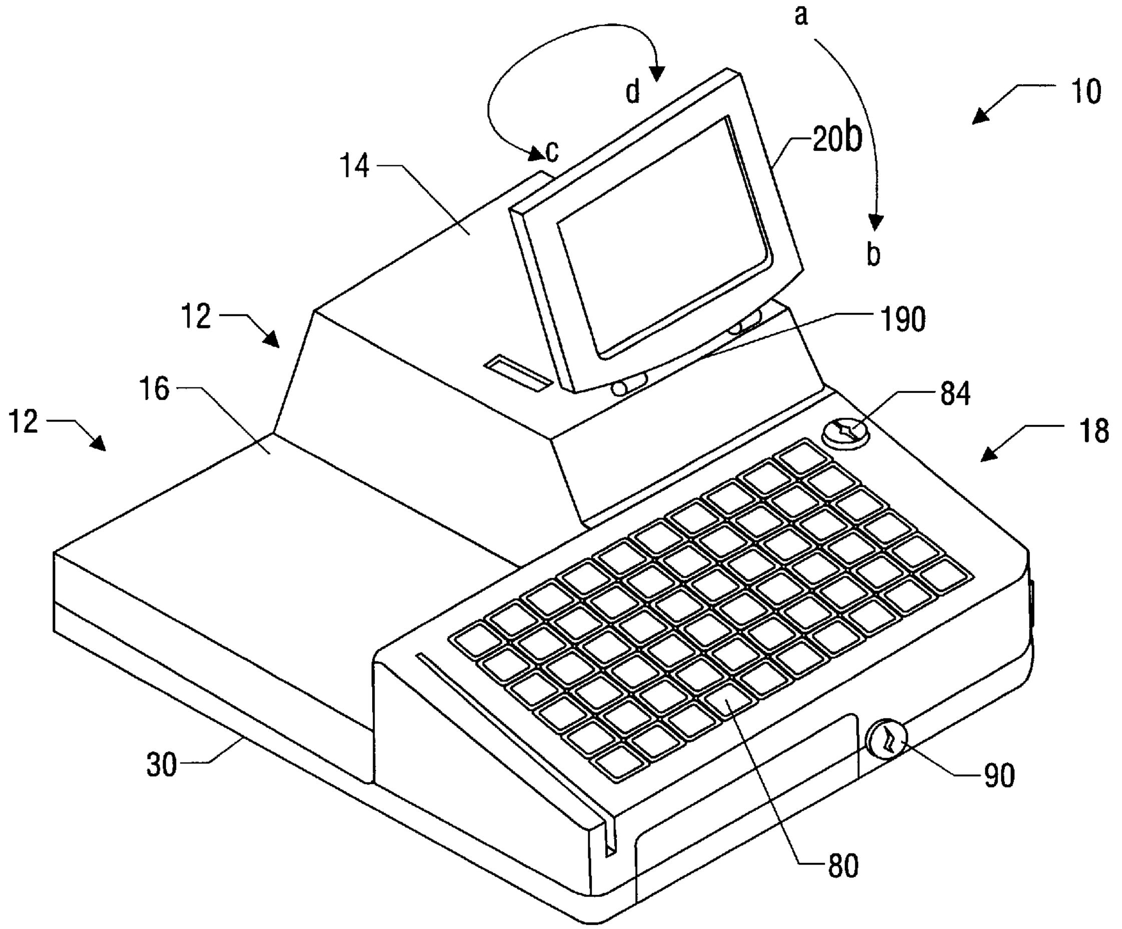
FIG. 8 is a perspective view illustrating another embodiment of the POS system of this invention having an LCD monitor display.

The two-dimensional movement of the monitor 20*a* is based on a simple yet efficient mechanism shown in FIG. 7. The bottom of the crater base 124 has a displacement rod 178 which desirably extends generally vertically and at least partially through a displacement slot 180 provided in the display platform 14 of the cabinet cover 32. The displacement slot 180 may be curved or straight as shown in FIG. 7 stretching along a Y-axis. The displacement rod 178 is configured to slide freely along the displacement slot 180 and the weight of the monitor 20*a* keeps the displacement rod 178 in place after adjustment of its position relative to the displacement slot 180. A second degree of freedom is one of rotation of the vertical center of rotation of the monitor 20*a* indicated as the Z axis relative to the center of rotation provided by the displacement rod 178 at a pivoting location spaced or skewed from the Z axis. The distance between the vertical center of rotation and the displacement rod 178 defines the moment arm. The linear degree of freedom along the Y-axis and the rotational degree of freedom provided by the moment arm result in two-dimensional movement of the crater base 124, and hence the monitor 20*a*, relative to the surface of the cabinet cover 32. The mechanism is simple and compact, and does not require a lot of components or space.

In the embodiment shown in FIG. 7, the display platform 14 of the cabinet cover 32 is generally flat. In another embodiment, the display platform 14 may be curved, for instance, made of a spherical shell section (not shown). In that case, the elongated slot provides one-dimensional degree of freedom of translation over a curved path while the skewed rod provides another one-dimensional degree of freedom or rotation. In yet another embodiment, the displacement slot 180 may be provided at the bottom of the crater base 124 spaced from the vertical center of rotation (Z-axis) and the displacement rod 178 provided at the display platform 14 (not shown). The mechanism works in much the same manner. The only difference is that the locations of the elongated slot and the rod have switched.

In sum, the monitor mounting mechanism 122 embodying the above features is quick and easy to use, and provides tilt and swivel and two-dimensional degrees of freedom as well as quick-release mounting for the CRT monitor 20*a*. The mounting mechanism 122 can be easily disassembled for service and replacement.

2. LCD Monitor

Figure 9B:
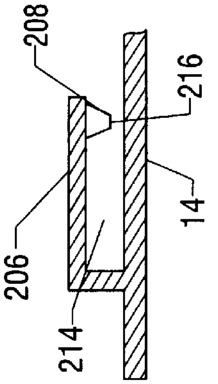
FIG. 9*b* is a side cross-sectional view of the mounting mechanism of FIG. 9*a* along line E—E.
Figure 9A:
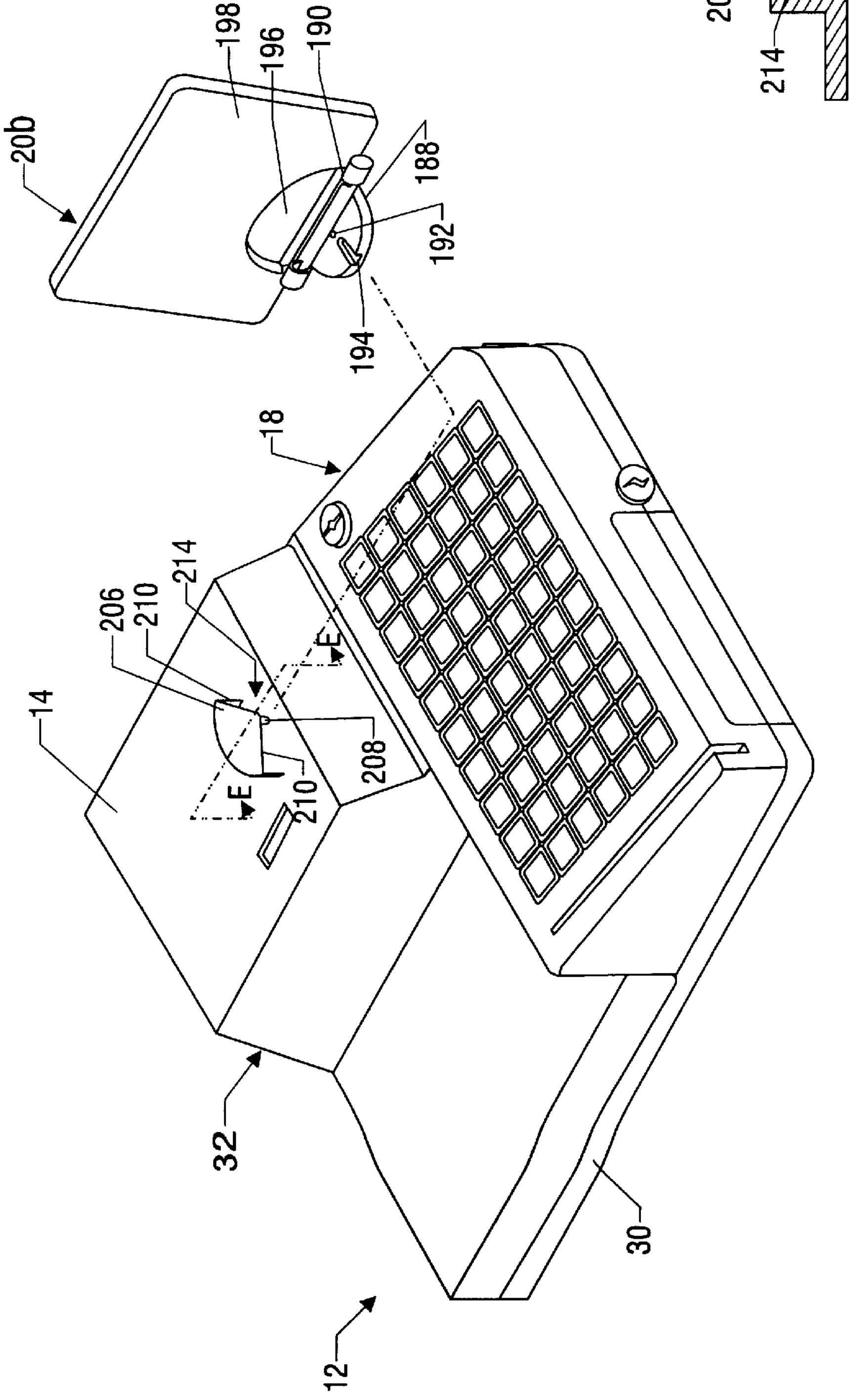
FIG. 9*a* is an exploded perspective view of the POS system of FIG. 8 illustrating the mounting mechanism for the LCD monitor display onto the display platform of the cabinet.

FIGS. 8–10 illustrate the mounting mechanism for an LCD monitor 20*b*. FIGS. 8 and 10 show the tilt-and-swivel feature of the LCD monitor 20*b* mounted for tilting (a–b) and swiveling (c–d). As best seen in FIG. 9*a*, the bottom of the LCD monitor 20*b* is connected to a back support plate 188, preferably with a hinge 190 for connection between the front edge of the back support plate 188. The hinged connection allows the monitor 20*b* to tilt forward and backward (a–b). The back support plate 188 desirably is generally a semicircular planar member and includes an indentation or notch 192 generally located at the center of semicircle. The back plate 188 desirably includes a groove or slot 194, more desirably straight, that extends from the free rear edge of the back support plate 188 toward the notch 192 to a notch tip that is preferably spaced from the notch 192 by a distance approximately equal to or greater than the size of the notch 192. The groove 194 is desirably generally perpendicular to the LCD monitor 20*b* and similar in depth to the notch 192. The back of the LCD monitor 20*b* advantageously includes a cut-out portion 196 that matches the back support plate 188 such that the back support plate 188 may be rotated or folded to the cut-out portion 196 by the hinge 190 and form a flat back surface 198 of the LCD monitor 20*b*.

On the display platform 14 of the cabinet cover 32 is a mounting plate 206 which includes a pin 208 partially extending toward the display platform 14. The mounting plate 206 desirably is an elevated plate supported by the display platform 14 and generally circular with the pin 208 located near its center. As shown in FIG. 9*a*, the mounting plate 206 is advantageously a circular pie segment of less than 180°, more desirably near 90°. The angle is defined by a pair of edges 210 that are desirably straight. The mounting plate 206 and the display platform 14 define a gap 214 advantageously having a size slightly larger than the thickness of the back support plate 188. The pin 208 preferably is tapered with a generally rounded tip 216 spaced by a distance from the display platform 14, as best seen in FIGS. 9*a* and 9*b*. The indentation 192 of the back support plate 188 cooperates with the pin 208 of the mounting plate 206. The shape of the indentation 192 preferably matches the shape of the tip 216 of the pin 208. The depth of the indentation 192 advantageously is sufficiently deep for secure locking between the pin 208 and the indentation 192 to prevent horizontal or lateral movement therebetween.

To install the LCD monitor 20*b*, the pin 208 is positioned to slide along the groove 194 of the back plate 188 until the pin 208 reaches the indentation 192 on the back plate 188 which releasably locks the pin 208 in position. In addition, the pin 208 of the mounting plate 206 and the indentation 192 of the back plate 188 cooperate with each other to allow rotational movement or swivel of the LCD monitor 20*b* relative to the display platform 14 along a vertical axis in the c–d direction. As best seen in FIG. 10, the mounting plate 206 has the arc shape which permits the LCD monitor 20*b* to rotate within a range of angles between the two edges 210 of the mounting plate 206. The hinged connection provides the tilting movement of the monitor 20*b* in the a–b direction. The hinge 190 desirably provides sufficient friction to allow continuous adjustment of the tilting of the monitor 20*b* with respect to the display platform 14. Other suitable mechanism can be used for adjusting the tilt, including those with discrete adjustments providing for a finite number of tilt angles.

In another embodiment, the groove 194 and indentation 192 may be provided at the bottom surface of the mounting plate 206 and the pin 208 may extend upwardly from the surface of the back support plate 188 (not shown). The operation will be similar to that shown in FIGS. 8–10. In yet another embodiment of the mounting mechanism, there may be provided a plurality of indentations 192 on the back support plate 188 to allow the pin 208 to engage the back plate 188 at different positions. This facilitates additional movement of the monitor 20*b* over the display platform 14 in a two-dimensional manner. The monitor 20*b* can thus be moved to various positions over the entire surface area of the display platform 14 by adjustment of the pin 208 from one indentation to another indentation (not shown).

The mounting of the LCD monitor 20*b* to the cabinet cover 32 is fast and easy, and the mounting mechanism permits convenient and precise swivel and tilt adjustment of the LCD monitor 20*b*. Although the mounting mechanism of FIGS. 8–10 is specially suited for LCD monitor 20*b*, the mounting of CRT monitor 20*a* can be performed with slight modifications without undue experimentation.

C. Customer Display Assembly

Figure 11A:
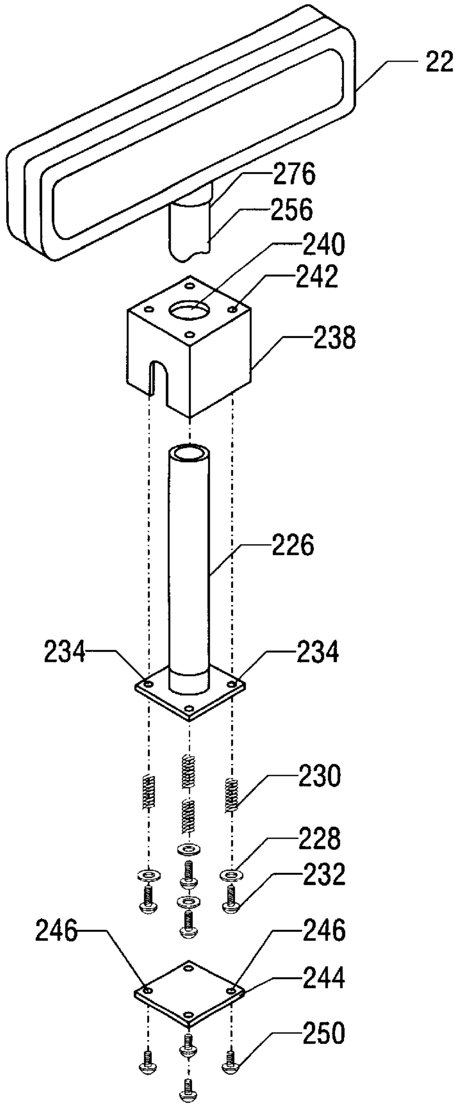
FIG. 11*a* is an exploded perspective view illustrating the resilient attachment mechanism for attaching the customer display onto the display platform of the cabinet.

The customer display assembly advantageously connects the customer display 22 to the display platform 14 for vertical adjustment, horizontal and rotational adjustment, and resilient mounting to protect the assembly. FIG. 11*a* shows the customer display 22 connected to the display platform 14 using a display mounting assembly that comprises a pole 226 spring-mounted onto the display platform 14. The spring mount mechanism comprises primarily a plurality of screws 228 loaded with springs 230. Washers 232 may be provided between the springs 230 and the heads of the screws 228. FIG. 11 shows four screws 228 which provide structural stability of the mount. Three screws 228 may be used as well, as may more than four screws 228. The bottom of the pole 226 advantageously provides a plurality of holes 234 sized to cooperate with the screws 228. The holes 234 are desirably evenly distributed for stability and efficiency and, in the case of four screws 228, distributed rectangularly. A base structure 238 provides an interior in which the screws 228 and the bottom of the pole 226 are housed. The base structure 238 has a pole opening 240 through which the top of the pole 226 passes. The pole opening 240 is advantageously slightly larger than the pole 226 in cross-section. The base structure 238 further includes a plurality of interior part-through holes 242 for attachment of the screws 228. A display mount plate 244 is provided for attachment of the base structure 238 to the display platform 14. The display mount plate 244 has a plurality of holes 246 for attachment using attachment screws 250.

Figure 11B:
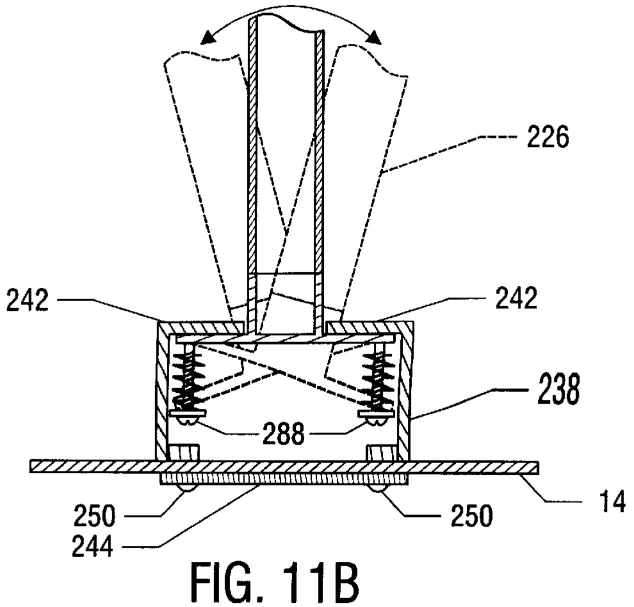
FIG. 11*b* is a side cross-sectional view illustrating the resilient attachment mechanism of FIG. 11*a*.

The spring-loaded screws 228 are inserted through the holes 234 provided at the bottom of the pole 226 onto interior part-through holes 242 of the base structure 238. The assembled structure is shown in FIG. 11*b*. When a transverse force is accidentally applied to the support pole 226 for the display, the springs 230 absorb much of the load by deforming (in compression or tension) and allowing the pole 226 to displace angularly as illustrated in FIG. 11*b*. This prevents accidental breakage of the pole 226 which is generally slender and long. The pole opening 240 of the base structure 238 allows room for the displacement of the pole 226. FIGS. 11*a* and 11*b* illustrate the mounting of the base structure 238 to the display platform 14 using a plurality of attachment screws 250 in conjunction with the display mount plate 244. Other means of attachment such as adhesives may also be used. In addition, although FIGS. 11*a* and 11*b* show the use of coil springs 230, other types of springs and other shock absorbing mechanisms may be used to absorb the transverse loading on the pole 226 and protect the customer display assembly.

Figure 12A:
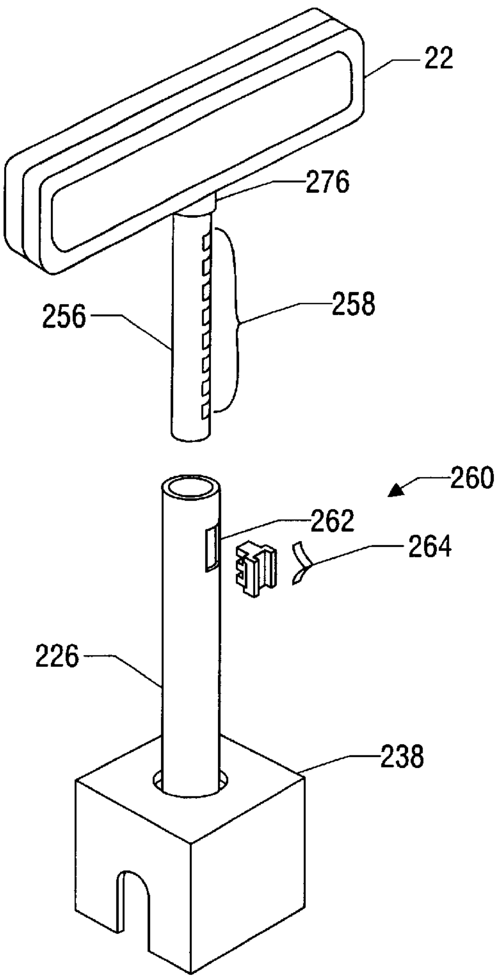
FIG. 12*a* is an exploded perspective view illustrating the quick-release height adjustment mechanism supporting the customer display.
Figure 12B:
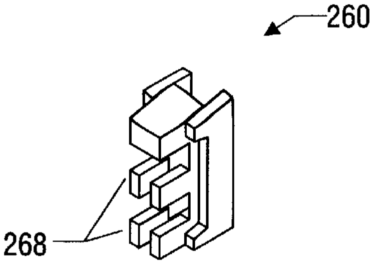
FIG. 12*b* is a perspective view of a height adjustment block of the quick-release height adjustment mechanism of FIG. 12*a*.
Figure 12C:
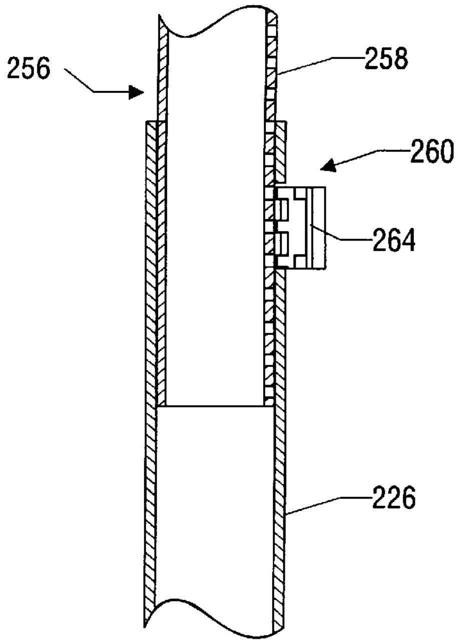
FIG. 12*c* is a side cross-sectional view of the quick-release height adjustment mechanism of FIG. 12*a* illustrating the engagement of the spring-loaded height adjustment block.
Figure 12D:
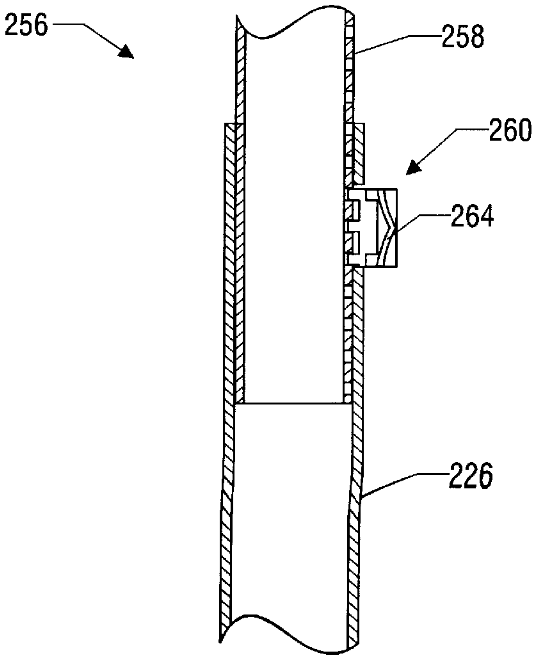
FIG. 12*d* is a side cross-sectional view of the quick-release height adjustment mechanism of FIG. 12*a* illustrating the release of the spring-loaded height adjustment block.

The vertical adjustment mechanism is shown in FIGS. 12*a*–12*d* to comprise an upper shaft 256 connected at the top to the customer display 22 and at the lower portion to the pole 226 which is connected through the base structure 238 to the display platform 14. The upper shaft 256 is slidably connected through the interior of the lower pole 226, desirably through a slip-fit for sturdy support of the customer display 22. The upper shaft 256 includes a plurality of vertically spaced slots 258. The lower pole 226 includes a spring-loaded block 260 best seen in FIGS. 12*a* and 12*b*. The block 260 is disposed through a block opening 262 along the wall of the pole 226. A spring plate 264 is supported by the pole 226 to press against the block 260 inwardly through the block opening 262. The spring plate 264 and the front portion of the block 260 are exposed at the outside of the pole 226 to be reachable with fingers to pull the block 260 with the spring plate 264 radially outwardly and release it radially inwardly, as best seen in FIGS. 12*c* and 12*d*. The back of the block 260 oriented inwardly includes one or more tabs 268 sized to cooperate with the vertically spaced slots 258 on the upper shaft 256 with sufficient strength to support the upper shaft 256 at a particular height.

To adjust the height of the customer display 22, the spring-loaded block 260 is pulled outwardly with human fingers to deform the spring plate 264 and disengage the block 260 from the vertically spaced slot 258 as shown in FIG. 12*d*. The upper shaft 256 is free to slide up or down inside the lower pole 226. After the height of the upper shaft 256 is adjusted upwardly or downwardly, the block 260 is released to allow the spring plate 264 to reform and return inwardly to press the block 260 against another vertically spaced slot 258 on the upper shaft 256. The quick-release mechanism is quick and easy to use, and facilitates removal of the display for repair or replacement. Other quick-release mechanisms may be used as well as is known to those skilled in the art. For example, the spring plate 264 may be replaced by other potential energy storage components. In another embodiment, the spring-loaded block 260 exerts such a large force on the upper shaft 256 that the friction created is sufficient to support the upper shaft 256 without the need for the vertically spaced slots 258. Such slots 258 are desirable, however, for stable and reliable support of the customer display 22.

Figure 13:
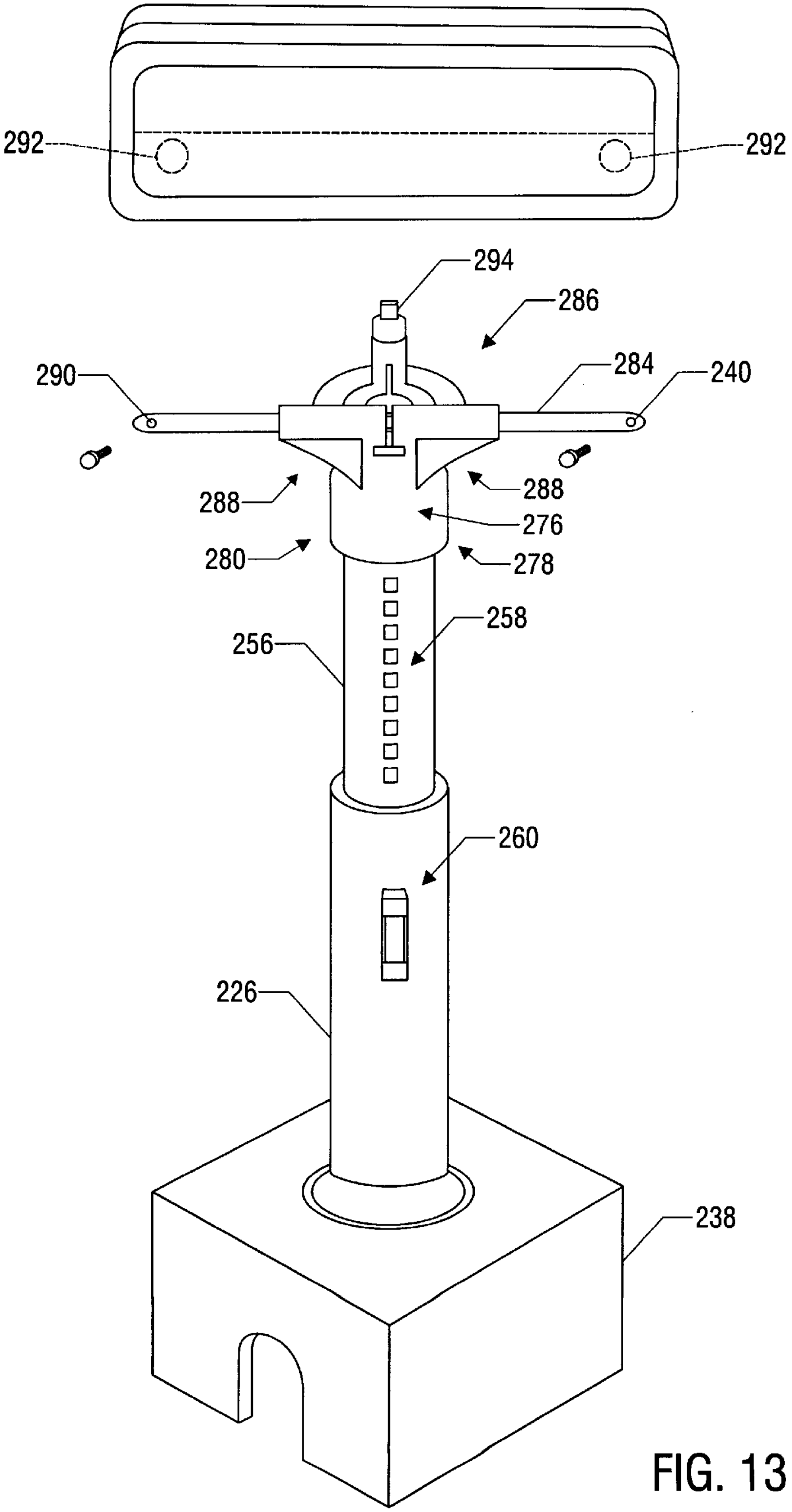
FIG. 13 is an exploded perceptive view of the horizontal sliding mechanism for the customer display.

FIG. 13 shows the quick-release rotational adjustment feature and horizontal sliding mechanism for the customer display 22. The rotational degree of freedom is provided by a slip-fit between the top of the upper shaft 256 and a cap structure 276 supporting the customer display 22. The cap structure 276 has an inner cavity 278 that is sized to rotate freely for 360° with respect to the upper shaft 256 with sufficient friction to maintain their relative position. For smooth rotation, the top portion 280 of the upper shaft 256 is generally circular and the inner cavity 278 of the cap structure 276 is also generally circular. In the embodiment shown, both the upper shaft 256 and the lower pole 226 are generally circular cylindrical.

The cap structure 276 of FIG. 13 provides a horizontal sliding mechanism supporting the customer display 22. The horizontal sliding mechanism comprises a slide rod 284 slidably supported by a guide path 286 provided at the cap structure 276. In one embodiment, the guide path 286 is formed by a pair of elongated openings 288, one on the left side and the other on the right side of the cap structure 276. The slide rod 284 is connected to the customer display 22, desirably at its two ends. The ends of the slide rod 284 have holes or apertures 290 that are connected to the customer display 22, desirably at two attachment holes 292 provided along a rear portion. FIG. 13 shows the use of a rear support clip 294 for additional support of the customer display 22. As the slide rod 284 slides relative to the cap structure 276, the customer screen display 22 also moves. The rotational freedom and the horizontal sliding capability facilitate positioning of the customer display screen 22 to avoid hitting objects such as candy racks placed next to the check-out counter.

The modular construction of the POS system 10 facilitates assembly and disassembly of the various components for repair and replacement. The POS system 10 is compact, and is designed for safety, security, and quick and easy adjustments to suit various operational environments.

It will be understood that the above-described arrangements of apparatus and the methods therefrom are merely illustrative of applications of the principles of this invention and many other embodiments and modifications may be made without departing from the spirit and scope of the invention as defined in the claims.

What is claimed is:

1. An electronics cabinet assembly comprising:

a base frame having a bottom, a left panel, and a right panel, said left panel including at least one left base portion having an aperture, said right panel including at least one right base portion with an aperture;

a cabinet cover having a top, a left wall, and a right wall, said left wall including at least one left cover portion with an aperture generally aligned with said aperture of said left base portion, said right wall including at least one right cover portion with an aperture generally aligned with said aperture of said right base portion;

a left release rod extending through said aperture of said left base portion and said aperture of said left cover portion from a front side of said cabinet assembly to a rear side of said cabinet assembly; and a right release rod extending through said aperture of said right base portion and said aperture of said right cover portion from said front side to said rear side.

2. The electronics cabinet assembly of claim 1, wherein said left base portion is a left knock-out portion of said left panel and said right base portion is a right knock-out portion of said right panel.

3. The electronics cabinet assembly of claim 1, wherein said left cover portion is a left block connected to said left wall and said right cover portion is a right block connected to said right wall.

4. The electronics cabinet assembly of claim 1, wherein said left base portion bears against said left cover portion and said right base portion bears against said right cover portion.

5. The electronics cabinet assembly of claim 1, wherein said bottom of said base frame is generally rectangular and said top of said cabinet cover is generally rectangular.

6. The electronics cabinet assembly of claim 1, wherein said top of said cabinet cover has a lower portion and an elevated portion, said lower portion for supporting a printer and said elevated portion for supporting a monitor.

7. The electronics cabinet assembly of claim 6, wherein said elevated portion is elevated above said lower portion by a height about the height of the printer.

8. The electronics cabinet assembly of claim 1, wherein said left release rod includes a left handle near said front side and said right release rod includes a right handle near said front side.

9. The electronics cabinet assembly of claim 8, wherein said left panel includes a left side tab against which said left handle may latch and said right panel includes a right side tab against which said right handle may latch.

10. The electronics cabinet assembly of claim 1, further comprising a keyboard cover disposed at said front side of said cabinet assembly and cooperating with said cabinet cover and base frame to form an enclosure.

11. The electronics assembly of claim 10, wherein said keyboard cover comprises a plurality of spaced clips and said cabinet cover comprises a plurality of corresponding grooves, said plurality of spaced clips attachable onto said corresponding plurality of grooves.

12. The electronics assembly of claim 10, wherein said keyboard cover comprises a plurality of spaced clips and said base frame comprises a plurality of corresponding grooves, said plurality of spaced clips attachable onto said corresponding plurality of grooves.

* * * * *